Nov. 10, 1936.  W. J. PEARMAIN  2,060,773
CLUTCH
Filed Jan. 7, 1933  2 Sheets-Sheet 1
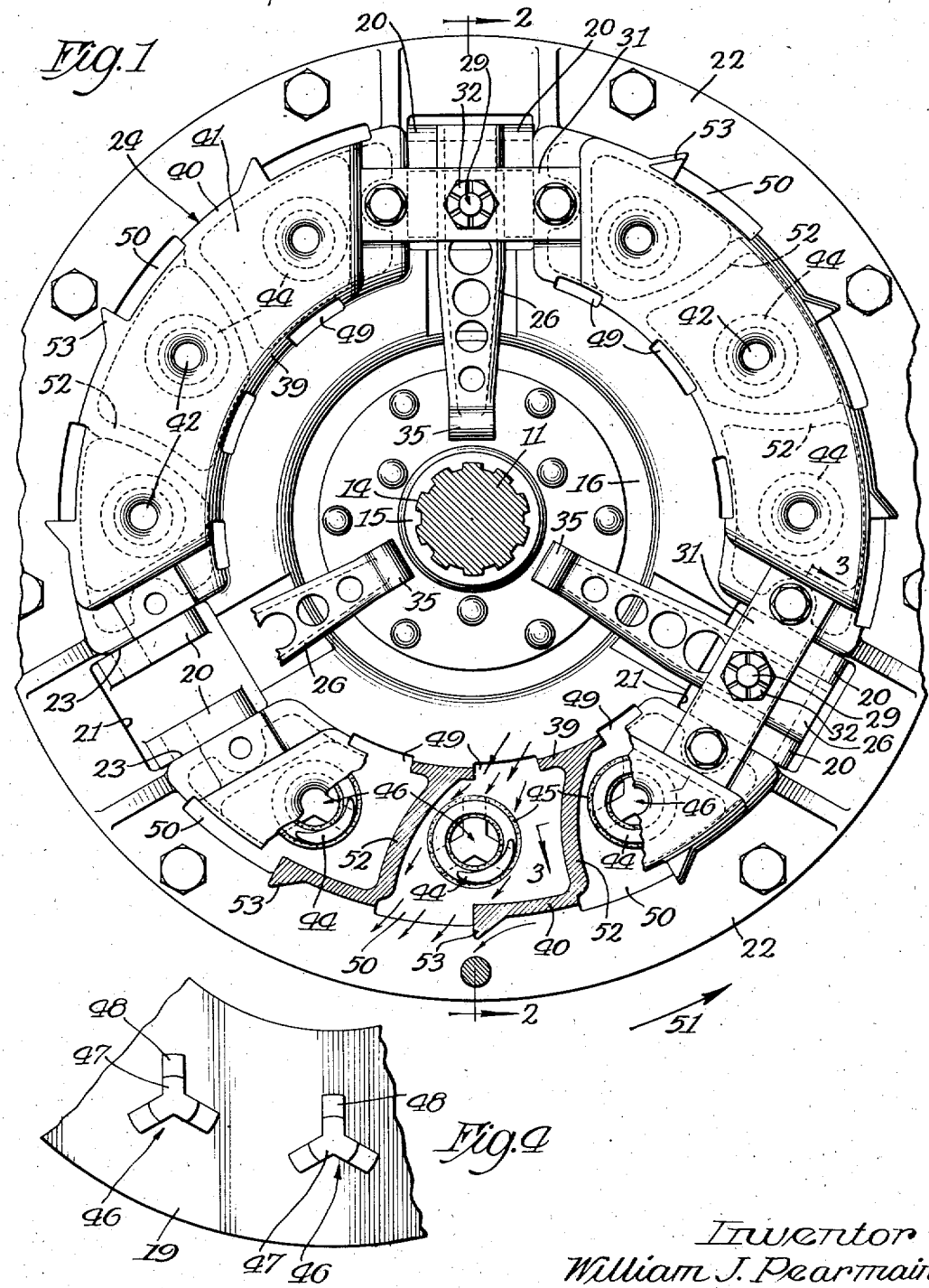
Inventor
William J. Pearmain
By Rector, Hibben, Davis & Macauley Attys.

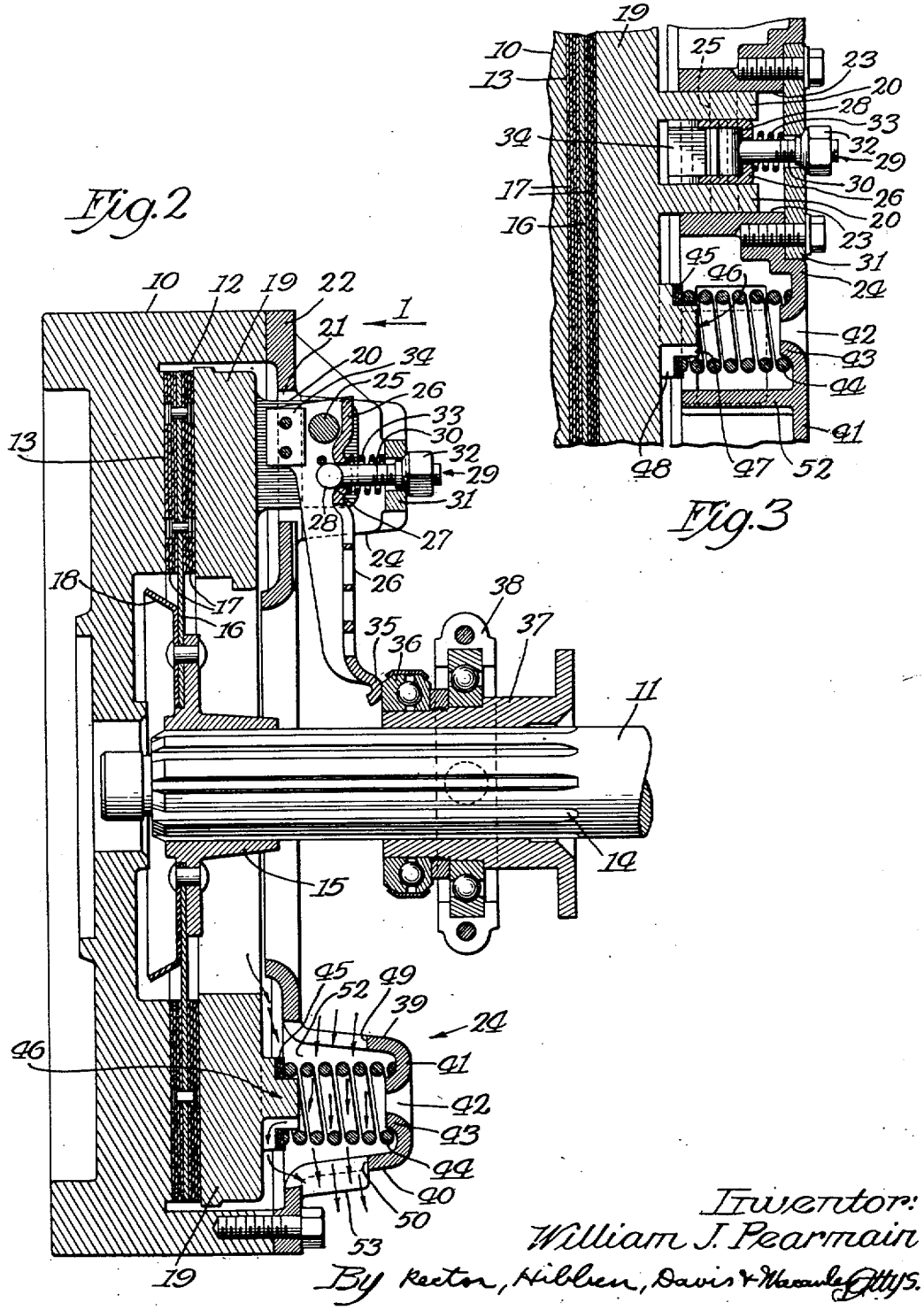

Patented Nov. 10, 1936

2,060,773

UNITED STATES PATENT OFFICE 2,060,773

CLUTCH

William J. Pearmain, Racine, Wis., assignor to Twin Disc Clutch Company, Racine, Wis., a corporation of Wisconsin Application January 7, 1933, Serial No. 650,614

19 Claims. (Cl. 192—113)

My invention relates to clutches and is directed more particularly to a clutch in which a transmission of power is effected between rotary parts through mechanism which is normally in driving engagement.

One object of my invention is to devise a clutch which is constructed and arranged to secure the passage of directed air streams over the loading springs in order to maintain them in a relatively cool condition and also to cool the pressure plate, the air streams being induced by the rotation of the clutch and the springs being heat-insulated from the pressure plate.

A further object is to provide a construction for cooling the loading springs whereby each spring is located in a substantially individual chamber and subjected to the cooling action of a substantially confined stream of air, the several streams being impelled outwardly of the clutch and discharged through openings in the chambers, each chamber being additionally provided with an outwardly directed baffle adjacent the leading edge of the discharge opening for the purpose of preventing any choking effect by the air relatively moving peripherally past the openings.

A further object is to devise a cooling system as above indicated wherein the air inlet openings for the several chambers are located rotationally in advance of the associated discharge openings in order to secure the movement of the air outwardly with a minimum of deflection and retarding effect on the rotation of the clutch.

A further object is to devise a clutch in which the unloading mechanism includes parts which have substantially universal connection with the pressure plate that grips the clutch or friction plate against the fly wheel or other rotary part, with a view of obtaining free movement within limits of the parts in question, resulting in their operation to the best advantage and an allowance for any manufacturing discrepancies in the several parts that might become noticeable upon assembly.

A further object is to provide a clutch of the character indicated in which the parts of the unloading mechanism may freely assume positions best suited to the release of the clutch, with a consequent reduction in the imposed stresses as compared with standard forms of construction and an improvement in the over-all strength characteristic of the clutch.

A further object is to devise a clutch in which the levers are directly mounted on the pressure plate, the fulcrums for the levers being provided by T-bolts which have a substantially universal anchorage on the cover plate, as well as a limited rolling connection with the levers, resulting in certain improvements from the standpoint of simplicity, flexibility, and capacity for direct action.

These and further objects of my invention will be set forth in the following specification, reference being had to the accompanying drawings, and the novel means by which said objects are effectuated will be definitely pointed out in the claims.

In the drawings:

Figure 1 is an end elevation of the clutch, partly in section, as viewed in the direction of the arrow 1 in Fig. 2.

Fig. 2 is a sectional elevation taken along the line 2—2 in Fig. 1, looking in the direction of the arrows.

Fig. 3 is a section along the line 3—3 in Fig. 1, looking in the direction of the arrows, showing the driving connection between the pressure and cover plates and the fulcrum mounting for the unloading mechanism.

Fig. 4 is a partial elevation of the pressure plate showing the arrangement of the spring seats which space the adjacent ends of the loading springs from the pressure plate.

Referring to Fig. 2, the numerals 10 and 11 designate, respectively, a fly wheel and a shaft which, for purpose of illustration, may be regarded generally as driving and driven members. The fly wheel 10 is internally bored as at 12 to provide a recess for the friction and pressure plates, as hereinafter described, and this boring operation also creates a wearing face 13 for a purpose presently explained. One end of the shaft 11 is splined as at 14 to receive a hub 15 which is thereby compelled to partake of the rotary motion of the shaft, but capacitated for axial movement therealong. The hub 15 has secured thereto a friction plate 16 which has attached on opposite sides thereof facings of frictional material 17. The hub 15 may also have secured thereto an oil throw ring 18.

The inner facing 17 of frictional material is intended to engage with the wearing face 13 on the fly wheel, while the outer facing 17 coacts with the adjacent face of a pressure plate 19, the friction and pressure plates being substantially housed within the fly wheel bore 12.

The outer face of the pressure plate 19 is provided with a plurality of pairs of driving lugs 20, each pair of which projects through an opening 21 provided in a cover plate 22 that is bolted to the fly wheel. The lugs 20 engage with shoulders 23 provided on spring housings 24 formed on the cover plate, as clearly shown in Figs. 1 and 3. As the unloading mechanisms which are associated with the driving lugs are identical in every respect, reference will hereinafter be made only to a single mechanism.

A pivot pin 25 is bridged between the pair of driving lugs and pivotally supports the outer end of a clutch lever 26 which, in the form shown, is denoted as having a channel section, with the connecting web of the section having a curved depression 27 for receiving the wings 28 of a T-bolt 29. The threaded shank 30 of this bolt extends through an opening in the web of the clutch lever and also through an opening provided in a bar 31 that is bridged across the shoulders 23 and secured to the cover plate 22. On the extremity of the shank 30 is mounted a ball-headed nut 32 which engages with a complementally shaped surface provided in the bar 31. A coil spring 33 encircles the shank 30 between the bar 31 and the web of the clutch lever for the purpose of retaining the wings 28 in the depression 27. The T-bolt functions as the fulcrum for the lever 26 in the manner hereinafter described and in order to insure the return of the lever to the position shown in Fig. 2, a counterbalance weight 34 is secured between the sides of the channel section comprising the clutch lever 26 on the side of the pivot pin 25 opposite to the wings 28.

The inner end of each clutch lever is formed as a nose 35 which is located adjacent the shaft 11 and intended to cooperate with a ball bearing collar 36 mounted on a sleeve 37 that is movable along the shaft 11. This sleeve also carries a collar 38 which may be provided with the usual trunnions for engagement with a suitable lever (not shown) that may be actuated in any desired manner to shift the sleeve 37 along the shaft.

As shown clearly in Fig. 1, the spring housings 24 possess a parti-annular conformation and are regularly spaced around the clutch, being separated from each other by the unloading mechanisms above described. Considering one housing and referring to Figs. 1 and 2, it will be noted that each housing possesses in transverse section the general appearance of a trapezoid having an inner wall 39 and an outer wall 40, these walls being connected by a vertical wall 41 which is provided with a plurality of openings 42 that are defined by flanges 43 projecting toward the pressure plate 19. These flanges function as centering bosses for the ends of clutch springs 44 whose opposite ends abut against insulating washers 45 which in turn are seated against centering bosses 46, each of which has a Y-shaped section in plan, or is generally in the form of a plurality of radially diposed arms, as clearly shown in Fig. 4. The centering portions of these bosses is provided by portions 47 having generally the same arrangement, but in which the arms are arranged with a shorter length in order to permit their insertion within the coils of the spring 44, the longer arms being denoted by the numeral 48 and it is against these arms that the insulating washers 45 are seated. As indicated in Figs. 1 and 2, this arrangement of centering bosses on the pressure plate provides spaced supports for the adjacent end of each spring, leaving the intervening portions of the spring coils free of any contact with the pressure plate and thereby facilitating the circulation of air streams outwardly between the arms of the bosses in the manner presently explained. The insulating washers may be formed of asbestos or any suitable material having equivalent heat insulating value and they tend to protect the springs from what would otherwise be directly conducted heat from the pressure plate.

One of the most important features of my improved clutch resides in the method of cooling the clutch springs by directing therethrough air streams induced by the rotation of the clutch. By this arrangement, the clutch springs are effectively cooled and prevented from acquiring a permanent set if the clutch should become overheated due to slippage or insufficient capacity. The directions of the air streams are such, as hereinafter explained, to exert some cooling effect on the pressure plate also.

In order to accomplish this cooling action, the inner walls 39 of the spring housings are provided with a plurality of air inlet openings 49, one being disposed adjacent each spring, while the outer walls 40 are similarly provided with a plurality of air discharge openings 50. As noted in Fig. 1, and considering each pair of associated openings 49 and 50, the inlet opening is located rotationally in advance of the discharge opening for a purpose presently explained, the direction of rotation of the clutch being indicated by the numeral 51 in Fig. 1. In order to better control the passage of the air stream across each spring, a plurality of webs 52 are transversely disposed of each spring housing in alternating relation to the several springs, the height of these webs being generally indicated in Figs. 2 and 3 and their effect, so far as control on the air streams is concerned, is to substantially isolate one spring from the other. As a final factor in the control of the streams of air, a baffle 53 extends outwardly from each leading edge of a discharge opening 50 in order to deflect away from the discharge opening the mass of air which is relatively moving peripherally of the clutch and which might otherwise exercise a choking effect on the discharge opening.

As shown in Fig. 2, the various members of the clutch are in driving position, owing to the pressure furnished by the springs 44 which grip the friction plate between the fly wheel and pressure plate. In this connection, it will be understood that, while the type of clutch illustrated embodies a single friction plate construction, those features to which the present application are more particularly directed are not dependent in any manner upon the number of friction plates and that one or more of these elements may be employed as desired and as is frequently customary in clutches of this type.

To release the clutch and thus interrupt the flow of power from the fly wheel to the shaft, the sleeve 37 is moved toward the left, as viewed in Fig. 2, thus causing a similar movement of the noses 35 on the clutch levers 26. For each lever, the fulcrum of the movement which then follows will be exercised against the wings 28 of the T-bolt 29, thus exerting a pull on this bolt with a resulting carriage of the pressure plate toward the right. When the sleeve 37 is moved in the opposite direction, the clutch springs 44 will renew the driving engagement of the several parts, while the counterbalance weights 34 will assist in returning the clutch levers to the positions shown in Fig. 2.

One of the principal difficulties encountered in the operation of friction clutches is the deteriorating action of the heat which is transmitted from the pressure plate to the clutch springs and which frequently results in these springs acquiring a permanent set and so rendering them useless for clutch operation. According to my invention, the springs are not only heat-insulated from the pressure plate, but they are also additionally subjected to the cooling action of positively directed air streams which serve to always maintain them in a relatively cool condition.

As noted above, the clutch springs are substantially isolated from each other and, in the operation of the clutch, air is impelled by centrifugal force through the inlet openings 49 of the spring housings and then through and around the associated spring for discharge outwardly through the openings 50, the webs 52 serving to confine these several air streams so as to obtain the maximum cooling effect by positively directing and controlling the action of each air stream. The path followed by each stream is generally indicated by the arrows in Figs. 1 and 2 and it will be particularly observed that, due to the rotational advance of the inlet openings with respect to the discharge openings, the air streams are directed outwardly of the clutch with a minimum of deflection and therefore a minimum retarding effect on the rotation of the clutch. In order to better assist in this operation, the connecting webs 52 are inclined generally to conform to the displaced relation of the inlet and discharge openings for the air. By considering Fig. 1, it will be noted that an imaginary line connecting the center points of the inlet and discharge openings will be generally tangentially disposed to the annular zone defined by the inner edge of the cover plate and the periphery of the shaft 11, so that these several ducts or passages through which the air is directed occupy the most efficient position with respect to that zone within the clutch from which the mass of air is being moved outwardly by the centrifugal action of the clutch. The several baffles 53 materially assist in this free moving action of the air streams, since they serve to deflect away from each discharge opening the mass of air which is relatively moving around the periphery of the clutch and which might otherwise exercise a choking effect on each discharge opening. It is also possible that the rotation of these baffles serves to create a partial vacuum in each discharge opening which facilitates the centrifugal movement of the air streams.

The foregoing type of clutch is characterized by simplicity of design, ease of assembly and adjustment, and ready accessibility for repair. The substantially rockable mounting of the T-bolts which provide the fulcrums for the clutch levers insures a favorable degree of flexibility and direct action for these parts, while the springs 33 which are mounted thereon, in conjunction with the counterbalance weights 34, substantially prevent any rattling of the clutch levers during operation. The arrangement whereby the clutch springs are air cooled during operation of the clutch is an important feature of this invention and it will be particularly noted that the air streams are not only directed transversely through the springs, but also flow inwardly between the radially projecting arms of the centering bosses 46 for ultimate movement outwardly through the discharge openings 50. These local air currents serve to materially decrease the temperature of the pressure plate.

I claim:

1. In a clutch, the combination of a pressure plate, loading springs acting at one end against said plate, and backing means contacting the opposite ends of the springs, said means having webs extending towards the plate for directing against said springs air streams induced by the rotation of the clutch.

2. In a clutch, the combination of a pressure plate, loading springs arranged in groups acting against said plate, a housing for each group having walls enclosing and backing the adjacent ends of the springs, and webs extending transversely of the housing in alternating relation to the springs for substantially localizing each spring, the inner and outer walls of the housing relative to the clutch axis being provided with cooperative pairs of inlet and exhaust openings, respectively, for directing between each pair of webs an air stream induced by the rotation of the clutch.

3. In a clutch, the combination of a pressure plate, loading springs arranged in groups acting against said plate, a housing for each group having walls enclosing and backing the adjacent ends of the springs, and webs extending transversely of the housing in alternating relation to the springs for substantially localizing each spring, the inner and outer walls of the housing relative to the clutch axis being provided with cooperative pairs of inlet and exhaust openings, respectively, for directing between each pair of webs an air stream induced by the rotation of the clutch, the inner opening of each pair being rotationally in advance of the outer opening.

4. In a clutch, the combination of a pressure plate, loading springs acting at one end against said plate, a housing having walls enclosing and backing the opposite ends of the springs, the inner and outer walls of the housing relative to the clutch axis being provided with cooperative pairs of inlet and exhaust openings, respectively, for each spring to direct therethrough an air stream induced by the rotation of the clutch, and baffle means located at the leading edge of each outer opening and extending outwardly of the clutch for deflecting away from said outer opening the air moving relatively to the periphery of the clutch.

5. In a clutch, the combination of a pressure plate, loading springs acting at one end against the plate, and a housing within which the opposite ends of the springs are seated, the inner and outer walls of the housing relative to the clutch axis being provided with inlet and exhaust openings, respectively, for air streams induced by the rotation of the clutch, and other walls provided in the housing for directing the streams against the springs.

6. In a clutch, the combination of a pressure plate, loading springs acting at one end against the plate, and a housing within which the opposite ends of the springs are seated, the inner and outer walls of the housing relative to the clutch axis being provided with cooperative pairs of inlet and exhaust openings, respectively, for each spring for air streams induced by the rotation of the clutch, the inlet opening of each pair being rotationally in advance of the exhaust opening, and other walls provided in the housing for directing the streams against the springs.

7. In a clutch, the combination of a pressure plate, loading springs acting at one end against the plate, and a substantially individual housing for each spring within which the opposite end of the spring is seated, the inner and outer walls of the housing relative to the clutch axis being provided with inlet and exhaust openings, respectively, for air streams induced by the rotation of the clutch, and other walls provided in the housing for directing the streams against the springs.

8. In a clutch, the combination of a pressure plate, loading springs acting at one end against the plate, and a substantially individual housing for each spring within which the opposite end of the spring is seated, the inner and outer walls of the housing relative to the clutch axis being provided with inlet and exhaust openings, respectively, for air streams induced by the rotation of the clutch, each inlet opening being rotationally in advance of its cooperative exhaust opening, and other walls provided in the housing for directing the streams against the springs.

9. In a clutch, the combination of a pressure plate, loading springs arranged in groups acting at one end against the plate, and a housing for each group within which the opposite ends of the springs are seated, the inner and outer walls of each housing relative to the clutch axis being provided with inlet and exhaust openings, respectively, for air streams induced by the rotation of the clutch, and other walls provided in each housing for directing the streams against the springs.

10. In a clutch, the combination of a pressure plate, loading springs acting at one end against the plate and arranged in groups, and a housing for each group within which the opposite ends of the springs are seated, the inner and outer walls of each housing relative to the clutch axis being provided with cooperative pairs of inlet and exhaust openings, respectively, for each spring for air streams induced by the rotation of the clutch, each inlet opening being rotationally in advance of the cooperative exhaust opening, and other walls provided in each housing for directing the streams against the springs.

11. In a clutch, the combination of a pressure plate, loading springs acting at one end against the pressure plate, a cover plate adapted for securement to a flywheel and the like, and having pockets within which the opposite ends of the springs are seated, the inner and outer walls of the pockets relative to the clutch axis being provided with inlet and exhaust openings, respectively, for air streams induced by the rotation of the clutch, other walls provided in the pockets for directing the cooling streams against the springs, and unloading mechanism for releasing the clutch having fulcrum means mounted on said cover plate.

12. In a clutch having loading springs, a cover plate adapted to be secured to a principal member of the clutch, such as a flywheel and the like, and against which one end of each loading spring is adapted to be seated, the plate including inlet and exhaust openings through which are adapted to pass cooling air streams induced by the rotation of the clutch and having webs extending transversely thereof for directing the streams against the springs.

13. In a clutch having loading springs, a cover plate adapted to be secured to a principal member of the clutch, such as a flywheel and the like, and having a housing within which the adjacent ends of the loading springs are adapted to be seated, the inner and outer walls of the housing relative to the axis of the plate being provided with inlet and exhaust openings, respectively, through which pass air streams induced by the rotation of the clutch, and other walls provided by the housing for directing the streams against the springs.

14. In a clutch having loading springs, a cover plate adapted to be secured to a principal member of the clutch, such as a flywheel and the like, and having a housing within which the adjacent ends of the loading springs are adapted to be seated, the inner and outer walls of the housing relative to the axis of the plate being provided with inlet and exhaust openings, respectively, through which are adapted to be passed air streams induced by the rotation of the clutch, the inlet and exhaust openings being arranged in cooperative pairs with the inlet opening of each pair rotationally in advance of the cooperate exhaust opening, and other walls provided by the housing adapted to direct the streams against the springs.

15. In a clutch having loading springs, a cover plate adapted to be secured to a principal member of the clutch, such as a flywheel and the like, and having a substantially individual housing for each loading spring, the adjacent end of each spring being adapted to be seated within the housing, the inner and outer wall of each housing relative to the axis of the plate being provided with inlet and exhaust openings, respectively, through which are adapted to pass cooling air streams induced by the rotation of the clutch, and other walls provided in each housing for directing the streams against the springs.

16. In a clutch having loading springs, a cover plate adapted to be secured to a principal member of the clutch, such as a flywheel and the like, and having a substantially individual housing for each loading spring, the adjacent end of each spring being adapted for seating in one of the housings, the inner and outer walls of each housing relative to the axis of the plate being provided with inlet and exhaust openings, respectively, through which are adapted to pass air streams induced by the rotation of the clutch, each inlet opening being rotationally in advance of the associated exhaust opening, and other walls provided in each housing for directing the streams against the springs.

17. In a clutch having loading springs, a cover plate adapted to be secured to a principal member of the clutch, such as a flywheel and the like, and having a plurality of housings within each of which groups of the loading springs are adapted to be seated, the inner and outer walls of each housing relative to the axis of the plate being provided with inlet and exhaust openings, respectively, through which are adapted to pass cooling air streams induced by the rotation of the clutch, and webs extending transversely of each housing and spaced for alternating relation to the springs and in alternating relation to the cooperative pairs of inlet and exhaust openings, the webs directing the streams against the springs.

18. In a clutch having loading springs, a cover plate adapted to be secured to a principal member of the clutch, such as a flywheel and the like, and having a plurality of housings within each of which a group of the loading springs of the clutch are adapted to be seated, the inner and outer walls of each housing relative to the axis of the plate being provided with inlet and exhaust openings, respectively, through which are adapted to pass cooling air streams induced by the rotation of the clutch, the inlet and exhaust openings being arranged in cooperative pairs with the inlet opening rotationally in advance of its associated exhaust opening, and webs extending transversely of each housing and spaced in alternating relation to the springs and to the cooperative pairs of inlet and exhaust openings, the webs directing the streams against the springs.

19. In a clutch having loading springs, a cover plate adapted to be secured to a principal member of the clutch, such as a flywheel and the like, and having a housing within which the adjacent ends of the loading springs are adapted to be seated, the inner and outer walls of the housing relative to the clutch axis being provided with inlet and exhaust openings, respectively, through which are adapted to pass cooling air streams induced by the rotation of the clutch, and baffle means located at the leading edge of each outer opening and extending in a direction outwardly from the center of the plate and adapted to deflect away from the outer openings the air moving relatively to the periphery of the plate.

WILLIAM J. PEARMAIN.

CERTIFICATE OF CORRECTION.

Patent No. 2,060,773.                                November 10, 1936.

WILLIAM J. PEARMAIN.

It is hereby certified that error appears in the printed specification of the above numbered patent requiring correction as follows: Page 4, first column, line 74, claim 13, after the word "which" insert are adapted to; and second column, line 16, claim 14, for "cooperate" read cooperative; and that the said Letters Patent should be read with these corrections therein that the same may conform to the record of the case in the Patent Office.

Signed and sealed this 26th day of January, A. D. 1937.

Henry Van Arsdale (Seal)                                    Acting Commissioner of Patents.

associated exhaust opening, and webs extending transversely of each housing and spaced in alternating relation to the springs and to the cooperative pairs of inlet and exhaust openings, the webs directing the streams against the springs.

19. In a clutch having loading springs, a cover plate adapted to be secured to a principal member of the clutch, such as a flywheel and the like, and having a housing within which the adjacent ends of the loading springs are adapted to be seated, the inner and outer walls of the housing relative to the clutch axis being provided with inlet and exhaust openings, respectively, through which are adapted to pass cooling air streams induced by the rotation of the clutch, and baffle means located at the leading edge of each outer opening and extending in a direction outwardly from the center of the plate and adapted to deflect away from the outer openings the air moving relatively to the periphery of the plate.

WILLIAM J. PEARMAIN.

CERTIFICATE OF CORRECTION.

Patent No. 2,060,773.  November 10, 1936.

WILLIAM J. PEARMAIN.

It is hereby certified that error appears in the printed specification of the above numbered patent requiring correction as follows: Page 4, first column, line 74, claim 13, after the word "which" insert are adapted to; and second column, line 16, claim 14, for "cooperate" read cooperative; and that the said Letters Patent should be read with these corrections therein that the same may conform to the record of the case in the Patent Office.

Signed and sealed this 26th day of January, A. D. 1937.

Henry Van Arsdale (Seal)  Acting Commissioner of Patents.

CERTIFICATE OF CORRECTION.

Patent No. 2,060,773.

November 10, 1936.

WILLIAM J. PEARMAIN.

It is hereby certified that error appears in the printed specification of the above numbered patent requiring correction as follows: Page 4, first column, line 74, claim 13, after the word "which" insert are adapted to; and second column, line 16, claim 14, for "cooperate" read cooperative; and that the said Letters Patent should be read with these corrections therein that the same may conform to the record of the case in the Patent Office.

Signed and sealed this 26th day of January, A. D. 1937.

Henry Van Arsdale

Acting Commissioner of Patents.

(Seal)